United States Patent [19]

Shawl et al.

[11] Patent Number: 5,985,989
[45] Date of Patent: Nov. 16, 1999

[54] METHOD OF MAKING A WATER REDUCING ADDITIVE FOR CEMENT

[75] Inventors: Edward T. Shawl, Wallingford; Xinhau Zhou, West Chester, both of Pa.

[73] Assignee: ARCO Chemical Technology, LP, Greenville, Del.

[21] Appl. No.: 08/890,092

[22] Filed: Jul. 9, 1997

[51] Int. Cl.⁶ ........................................ C08K 5/06
[52] U.S. Cl. .................... 524/755; 524/761; 524/762; 525/330.1
[58] Field of Search .............. 525/330.1; 524/755, 524/761, 762

[56] References Cited

U.S. PATENT DOCUMENTS

| | | | |
|---|---|---|---|
| 4,814,014 | 3/1989 | Arfaei | 106/90 |
| 4,946,506 | 8/1990 | Arfaei et al. | 106/724 |
| 4,946,904 | 8/1990 | Akimoto et al | 525/327.8 |
| 4,972,025 | 11/1990 | Tsubakimoto et al. | 525/329.4 |
| 5,100,984 | 3/1992 | Bürge et al. | 526/240 |
| 5,223,036 | 6/1993 | Koyata et al. | 106/724 |
| 5,362,323 | 11/1994 | Koyata et al. | 106/810 |
| 5,369,198 | 11/1994 | Albrecht et al. | 526/240 |
| 5,391,664 | 2/1995 | Takei et al. | 526/210 |
| 5,391,665 | 2/1995 | Matsunaga et al. | 526/211 |
| 5,393,343 | 2/1995 | Darwin et al. | 106/808 |
| 5,432,212 | 7/1995 | Honda et al. | 524/4 |
| 5,436,314 | 7/1995 | Yang et al. | 528/274 |
| 5,476,885 | 12/1995 | Tahara et al. | 524/4 |
| 5,478,521 | 12/1995 | Scheiner | 264/333 |
| 5,494,516 | 2/1996 | Drs et al. | 106/819 |
| 5,612,396 | 3/1997 | Valenti et al. | 524/5 |
| 5,614,017 | 3/1997 | Shawl | 106/823 |
| 5,618,782 | 4/1997 | Gopalkrishnan et al. | 510/418 |

FOREIGN PATENT DOCUMENTS

| | | |
|---|---|---|
| 9700898 | 1/1997 | WIPO . |
| 9711132 | 3/1997 | WIPO . |

*Primary Examiner*—Edward J. Cain
*Attorney, Agent, or Firm*—William C. Long

[57] ABSTRACT

Substances useful as water reducing and superplasticizer additives for cement compositions are formed by in situ polymerization of one or more ethylenically unsaturated acid monomers such as acrylic acid or maleic anhydride in a reaction medium comprising a polyether such as polypropylene glycol or a copolymer of ethylene oxide and propylene oxide to form a carboxylic acid polymer, followed by reaction of the polyether and carboxylic acid polymer. The composition and properties of the resulting additives may be readily varied as desired through the use of different acid monomers, polyethers, reaction conditions, reagent proportions and the like.

19 Claims, No Drawings

METHOD OF MAKING A WATER REDUCING ADDITIVE FOR CEMENT

FIELD OF THE INVENTION

This invention relates to methods of producing water reducing additives for use in cement and concrete compositions wherein a polyether or mixture of polyethers is utilized as a reaction medium for the polymerization of unsaturated acid monomers such as acrylic acid. The carboxylic acid polymer obtained by polymerization is reacted with the polyether under conditions effective to achieve esterification of the polyether by the carboxylic acid polymer. Preferably, the reaction conditions are also effective to achieve partial cleavage of the polyether and esterification of the polyether cleavage products by the carboxylic acid polymer.

BACKGROUND OF THE INVENTION

U.S. Pat. No. 5,614,017 describes substances useful as water reducing and superplasticizer additives for cement composition which are formed by reaction of carboxylic acid polymers with polyethers of $C_2$–$C_4$ epoxides. The procedure taught by the patent for preparation of such additives involves the use of a preformed carboxylic acid polymer which is combined with the polyether to be reacted. Unfortunately, such a procedure has a number of practical disadvantages. Only a limited number of different carboxylic acid polymers are available commercially. Optimizing the properties of the additive by adjusting the composition and molecular weight of the carboxylic acid polymer thus is somewhat difficult. Another problem is that certain carboxylic acid polymers are insoluble in or immiscible with many polyethers; initiation of the necessary esterification and polyether cleavage reactions cannot be readily accomplished. While water can be used as a solvent to dissolve both reagents, the water must be stripped out before a significant degree of ester formation can occur. As water is removed, the polyether and carboxylic acid polymer phase-separate, preventing further esterification.

Given such difficulties, it would be highly desirable to develop alternative synthetic methods for the preparation of these useful cement additives which more readily permit a wide variety of carboxylic acid polymers and polyethers to be utilized.

SUMMARY OF THE INVENTION

This invention provides a method of producing a water reducing additive comprising polymerizing a polymerizable acid monomer in a reaction medium comprising a polyether to form a carboxylic acid polymer. The polymerizable acid monomer contains at least one ethylenically unsaturated group in conjugation with a carboxyl group selected from the group consisting of carboxylic acid, carboxylic anhydride and carboxylic ester groups. The polyether is prepared by polymerizing a $C_2$–$C_4$ epoxide.

The carboxylic acid polymer and the polyether are reacted under conditions effective to achieve esterification of the polyether by the carboxylic acid polymer to form the water reducing additive. In a preferred embodiment, partial cleavage of the polyether and esterification of the cleavage products thereof also are accomplished.

The process of this invention is capable of preparing a remarkably broad range of water reducer compositions, since the solubility problems encountered with previously known procedures are largely circumvented.

DETAILED DESCRIPTION OF THE INVENTION

The polymerizable acid monomers used in the process of this invention are characterized by the presence of at least one polymerizable ethylenically unsaturated group in conjugation with a carboxylic acid, carboxylic anhydride or carboxylic ester group. "Acid" in this content thus refers to any moiety capable of functioning as an equivalent to or precursor of a free carboxylic acid group. Such monomers include monomers corresponding to the structure

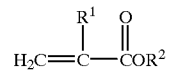

wherein $R^1$ and $R^2$ are each independently hydrogen or $C_1$–$C_4$ alkyl (e.g., methyl, ethyl, propyl, butyl). Other suitable monomers include cyclic unsaturated anhydrides and unsaturated dicarboxylic acids and $C_1$–$C_4$ alkyl esters thereof. Preferred acid monomers include, but are not limited, to acrylic acid, methacrylic acid, methyl methacrylate, methyl acrylate, fumaric acid, maleic acid, itaconic anhydride, citraconic anhydride, itaconic acid, citraconic acid, maleic anhydride and combinations thereof. The polymerizable acid monomer may be in salt form, i.e., where $R^2$ is ammonium (e.g., $NH_4$ or an alkylammonium species), an alkali metal (e.g., Na, K), or an alkaline earth metal. The polymerizable acid monomer or mixture of monomers should be selected to be miscible with the polyether component under the reaction conditions so that the polyether functions as a solvent for the polymerization and esterification steps.

In one embodiment of the invention, the carboxylic acid polymer consists essentially of the acid monomer(s) in polymerized form (i.e., the acid monomer may comprise up to 100% of the polymer). However, satisfactory results may also be obtained even where the acid monomer is copolymerized with a different type of polymerizable monomer such as ethylene or other ethylenically unsaturated compound. Preferably, however, at least 25 mole % of the repeating units in the polymer are repeating units of the acid monomer.

In one desirable embodiment of the invention, acrylic acid is homopolymerized. In another embodiment, acrylic acid and maleic anhydride are copolymerized. Other illustrative examples of copolymerizable monomers suitable for use in the present invention include (a) ethylene and acrylic acid, (b) ethylene and methacrylic acid, (c) ethylene and maleic anhydride, and (d) methyl methacrylate and methacrylic acid.

In one embodiment of the invention, the other material utilized is a polyether comprised of, in polymerized form, one or more $C_2$–$C_4$ epoxides. The polyether may thus be any homopolymer or copolymer having repeating units linked by ether linkages with two carbon atoms separating each ether linkage. The polyether functions as a solvent or reaction medium for the polymerization step of the process, but also reacts with the carboxylic acid polymer formed thereby. Preferably, the polyether is substantially saturated (i.e., does not contain any carbon-carbon double bonds such as vinyl or allyl groups, other than such minor amounts as may be present as impurities from the side reactions which take during polymerization such as, for example, the base-catalyzed rearrangement of propylene oxide to allyl alcohol and alkoxylation of the allyl alcohol). For example, the polyether may typically have an unsaturation value of less than 0.10 meq/g.

Preferred polyethers are polyethers containing one or more terminal hydroxyl groups. Preferably, however, the polyether does not have a functionality greater than 2. That is, the use of polyethers having one or two terminal hydroxyl groups is desirable. It is preferred to use as at least a predominate component of the polyether a mono-functional polyether since problems with undesirable gelling of the reaction product are thereby minimized. The precise molecular weight of the polyether reactant is not considered critical, but may typically range from 200 to 20,000 (number average). Suitable polyethers thus include, but are not limited to, mono- and di- functional polypropylene glycols, polyethylene glycols, and ethylene oxide-propylene oxide copolymers. The composition and molecular weight of the polyether are desirably selected such that the cement additive obtained from the polyether is water-soluble.

In a second embodiment of the invention, a mixture of polyethers is employed, each of which is comprised of, in polymerized form, one or more $C_2$–$C_4$ epoxides. One polyether is monofunctional (i.e., contains one hydroxyl group per molecule), while the other polyether is difunctional (i.e., contains two hydroxyl groups per molecule). The polyethers may be derived from the same $C_2$–$C_4$ epoxide or mixture of $C_2$–$C_4$ epoxides; alternatively, different $C_2$–$C_4$ epoxides may be used to prepare the monofunctional and difunctional polyethers.

The precise molecular weights of the polyether reactants in such a mixture are not considered critical, but may typically range from 200 to 20,000 (number average). The compositions and molecular weights of the polyethers in the mixture are desirably selected such that the cement additive obtained from the polyether is water-soluble. It is desirable to control the amount of difunctional polyether relative to monofunctional polyether in order to avoid excessive crosslinking, which tends to reduce the solubility of the product derived therefrom in water. The weight ratio of monofunctional to difunctional polyether thus is typically maintained in the range 3:1 to 25:1.

For both of the above-mentioned embodiments of this invention, preferred $C_2$–$C_4$ epoxides include propylene oxide, ethylene oxide, and mixtures thereof. For example, the mole ratio of oxyethylene to oxypropylene repeating units in the polyethers may vary from 1:99 to 99:1. Generally speaking, the incorporation of higher proportions of oxyethylene repeating units in the polyether mixture will tend to increase the water solubility of the resulting cement additive. However, the use of oxyalkylene repeating units derived from substituted epoxides such as propylene oxide and 1-butene oxide tends to increase the susceptibility of the polyethers to undergo the desired partial cleavage during reaction with the carboxylic acid polymer. The polyether may additionally contain repeating units other than those derived from $C_2$–$C_4$ epoxides. Copolymers of $C_2$–$C_4$ epoxides with other cyclic ethers such as oxetanes, oxolanes (e.g., tetrahydrofuran), and the like may be used to advantage, for example. In one preferred aspect of the embodiment of this invention which employs a mixture of polyethers, the difunctional polyether is a homopolymer of propylene oxide (i.e., polypropylene glycol).

Polyethers corresponding to the foregoing description are well-known in the art and may be readily obtained from a number of commercial sources. Methods for their preparation include, for example, the base-catalyzed or double metal cyanide complex-catalyzed reaction of $C_2$–$C_4$ epoxide (s) with a suitable initiator having one or two active hydrogen atoms. In the above-mentioned second embodiment of the invention, the mono-functional polyether may be obtained by polymerizing a $C_2$–$C_4$ epoxide onto a monofunctional initiator (i.e., a compound having a single active hydrogen atom such as a mono-alcohol) such as a $C_1$–$C_{10}$ aliphatic alcohol (e.g., methanol, ethanol, n-propanol), glycol ether (e.g., propylene glycol mono-methyl ether, diethylene glycol mono-t-butyl ether, tripropylene glycol monomethyl ether) or the like. The difunctional polyether may be prepared by polymerizing a $C_2$–$C_4$ epoxide onto a difunctional initiator (i.e., a compound having two active hydrogen atoms such as a di-alcohol) such as a glycol (e.g., propylene glycol, ethylene glycol, 1,4-butanediol and the like) and oligomers thereof (e.g., tripropylene glycol, diethylene glycol). The polyethers may also be recycled materials recovered by glycolysis or hydrolysis from a polyurethane foam or the like.

The precise relative proportions of the polyether and polymerizable acid monomer are not critical, except that the number of equivalents of polyether or polyether mixture reacted should be less than the number of equivalents of the carboxyl groups derived from the polymerizable acid monomer. The equivalent ratio of carboxyl groups in the polymerizable acid monomer component to hydroxyl groups in the polyether or polyether mixture component is selected to be 1:1 or higher, preferably from 2:1 to 20:1.

The precise molecular weight of the carboxylic acid polymer which is attained by polymerization of the acid monomer in the polyether-containing reaction medium is not particularly critical and may be varied as desired to control the properties of the resulting cement additive. Typically, however, the carboxylic acid polymer generated has a number average molecular weight of from 500 to 2,000,000. In one preferred embodiment of the invention, the number average molecular weight ranges from 500 to 10,000.

The polymerization may be carried out using one or more solvents in addition to the polyether, but preferably no additional solvent is present. It is preferable to incorporate a free radical initiator in the mixture of the polyether and the unsaturated acid monomer to promote the polymerization. Any of the initiators (also sometimes referred to as "catalysts") known in the art to be capable of initiating a polymerization which proceeds by a free radical mechanism may be utilized. Suitable initiators include, for example, peroxides such as, for example, benzoyl peroxide, methyl ethyl ketone peroxide, or lauroyl peroxide, hydroperoxides such as, for example, cumene hydroperoxide or t-butyl hydroperoxide, peresters such as, for example, diisopropyl peroxydicarbonate, aliphatic azo compounds such as, for example, azobisiso-butyronitrile (AIBN), or inorganic peroxy compounds such as sodium persulfate (which may be used in combination with reducing agents in a redox-type initiator system). Typical initiator concentrations are between 0.1 to 10 weight percent based on the weight of monomer to be polymerized. Chain transfer agents such as mercaptans and the like may also be used to modify the molecular weight and other characteristics of the carboxylic acid polymer.

The manner in which the unsaturated acid monomer or mixture of monomers is added to the polyether is not considered critical. For example, the monomer(s) may be added all at once to the polyether and polymerization then initiated. Alternatively, polymerization may be initiated in the presence of a portion of the monomer(s) with the remainder of the monomer(s) being added incrementally. Likewise, the free radical initiator and chain transfer agent may be added at one time or in portions if so desired. Additional portions of the polyether may also be added after polymerization is initiated with a first polyether portion. The initiator and the unsaturated acid monomer may both be added incrementally to the polyether.

Although when a relatively reactive free radical initiator is used the polymerization may be effected at ambient or subambient temperatures, it is generally preferred to employ temperatures in the range of from 35° C. to 150° C., more preferably, 50° C. to 130° C. The polymerization is conveniently effected at atmospheric pressure, but an elevated pressure may be desirable when the monomer or monomers being reacted are relatively volatile. It is also preferred to carry out the polymerization in a substantially oxygen-free atmosphere. Polymerization times of from about 0.5 to 24 hours will generally suffice to accomplish the desired degree of monomer conversion.

While the predominate transformation taking place during polymerization is conversion of the unsaturated acid monomer(s) into the carboxylic acid polymer, it is believed that under certain conditions the polyether may also participate in the reaction. For example, hydrogen radicals may be abstracted from the carbon atoms along the polyether backbone with the resulting radical site being capable of reacting with the acid monomer or growing carboxylic acid polymer chain. In one embodiment of the invention, however, the polymerization conditions are selected so that such grafting reactions are minimized or substantially avoided.

The mixture of polyether and carboxylic acid polymer resulting from polymerization of the unsaturated acid monomer is reacted under conditions effective to at least achieve esterification of the polyether by the latter reactant. In yet another embodiment, the reaction conditions are controlled such that, in addition to simple esterification, partial cleavage of the polyether take place. The cleavage products derived from the polyether also are esterified by the carboxylic acid polymer formed in the in situ polymerization step of the process. It is believed that the active hydrogen groups of the polyether react with the carboxylic acid groups of the carboxylic acid polymer to form carboxylic ester bonds. The acid groups thus act as graft sites connecting the polymeric backbone moiety derived from the carboxylic acid polymer with polymeric side chain moieties derived from the polyether. While the precise mechanism of said reaction and chemical structure of the resulting product are not known, it is believed that cleavage of some, but not all, of the ether linkages of the polyether takes place and that the resulting cleavage products ultimately participate in the desired esterification of the acid groups originally present in the carboxylic acid polymer. The cleavage products are likely in the form of lower molecular weight polyethers representing fragments of the original polyether and may, for example, be oligomers of $C_2$–$C_4$ epoxides such as di-, tri-, tetra- and higher polyoxyalkylene glycols and derivatives thereof, including, for example, mono-alkyl ethers. Where the polymerized acid monomer is present in alkyl ester form, the esterification process may be alternatively described as interesterification wherein the $C_1$–$C_4$ alkyl group is displaced by the polyether or cleavage products thereof. It is preferred that the majority of the ether linkages in the starting polyether remain uncleaved. In one embodiment of the invention, only from about 1 to 25% of such linkages undergo cleavage.

While simple esterification of the reactants may be accomplished in the absence of any added catalyst (the carboxylic acid polymer in some embodiments being capable of self-catalysis due to its acidic character), the combined cleavage/esterification reaction of the polyether and carboxylic acid polymer is preferably catalyzed by a strong protic acid. The acid is preferably introduced after completion of the polymerization of the acid monomer. Suitable protic acids are those substances having a pKa less than 0. Generally, the acid will be a stronger acid than a carboxylic acid. Preferred strong protic acids include arylsulfonic acids, alkylsulfonic acids, and sulfonic acid ion exchange resins. Inorganic as well as organic acids may be utilized; the acid may be soluble or insoluble in the reaction mixture. Other suitable acids are hydrogen halides, halosulfonic acids, tetrafluoroboric acid, heteropolyacids, and sulfuric acids. Mixtures of different acids can be used. Illustrative examples of acids useful in the present invention include, but are not limited to, p-toluene sulfonic acid, trifluoromethanesulfonic acid, methane sulfonic acid, hydrochloric acid, phosphotungstic acid, "Nafion" resins, "Amberlyst 15" resin, and the like. The protic acid may be added in salt form (e.g., zinc triflate), such that the acid is generated in situ by interaction with the carboxylic acid polymer.

The protic acid is used in an amount effective to promote the aforedescribed cleavage and esterification reactions. The preferred amount to be employed depends upon many factors, including the desired reaction rate, the types of reactants and catalyst used, reaction temperature, and other considerations. Generally, suitable amounts of protic acid are within the range of about 0.01 to 1 weight percent based on the quantity of polyether or polyether mixture to be reacted.

The esterification/cleavage step of the invention is conveniently performed by heating the mixture of polyether, carboxylic acid polymer and strong protic acid at a temperature sufficient to cause the desired cleavage and esterification to proceed at sufficiently rapid rates. The progress of the esterification reaction can be followed measuring the acid number, which will decrease as esterification proceeds, by conventional wet chemical analytical techniques. Generally, it will be advantageous to conduct said reaction until from 1 to 90% (more typically, 20 to 75%) of the carboxyl groups initially present in the carboxylic acid polymer are esterified. The optimum degree of esterification will vary, but will depend upon the molecular weight of the carboxylic acid polymer and the extent of polyether cleavage among other factors.

Where the polyether is comprised of repeating oxypropylene units derived from propylene oxide, the extent of polyether cleavage may be checked by monitoring the level of head-to-head ether linkages in the polyether by NMR. The extent of reaction (i.e., esterification plus cleavage) may also be estimated by measurement of the acid number. When a desirable level of esterification and cleavage is achieved, the acid number will typically be less than the theoretical acid number (calculated from the relative proportions and functionalities of the starting materials) which would be attained if esterification of the original polyethers, but not any cleavage products thereof, had been completed.

The temperature selected should be sufficiently high so as to promote both the desired cleavage and esterification. While the minimum temperature required for such purpose will vary depending upon a number of factors, it has been found that where the polyether is derived in whole or in part from propylene oxide, the carboxylic acid polymer is derived in whole or in part from acrylic acid, and the strong protic acid is a sulfonic acid, temperatures in excess of 120° C. (more preferably, 150° C. to 200° C.) are needed. In one embodiment of the invention, the reaction mixture is first heated to a somewhat lower temperature (e.g., 75° C. to 120° C.) for a period of time sufficient to accomplish substantial simple esterification (but not a significant amount of cleavage) of the initially charged polyether, followed by heating at a temperature effective to cause polyether cleavage accompanied by esterification of the polyether cleavage products.

Esterification may be favored by removing the water or other by-products formed as a result of esterification from the reaction mixture (as well as any water present in the reactants initially) by appropriate means such as distillation or the like. Application of vacuum or an inert gas sparge may be helpful.

Once the appropriate degree of esterification and, if so desired, cleavage has been attained (typically, from about 0.5 to 18 hours), purification or further modification of the reaction product may be performed prior to its use as a cement additive. For example, the strong protic acid may be removed by any suitable method such as filtration, neutralization, or the like. The residual carboxylic acid groups in the additive may be either left in the acid form, or, if so desired, converted in whole or part to the salt form by reaction with a suitable source of alkali metal (e.g., sodium hydroxide, potassium hydroxide), alkaline earth metal (e.g., calcium hydroxide), ammonium (e.g., ammonia, alkyl amines such as triethanol amine and triisopropanol amine) or the like. The cation in the resulting salt thus may be an alkali metal cation. Ammonium as well as alkaline earth metal cations may also serve as the cation for such purpose. If the acid monomer used to prepare the carboxylic acid polymer was in anhydride form, some or all of the anhydride groups which may still be present in the polymer after reaction with the polyether may be converted into free acid or salt form by hydrolysis or other such means using methods conventional in the art. Cleavage or hydrolysis of the ester linkages between the polyether and the carboxylic acid polymer should, however, be minimized by careful selection of the conversion conditions utilized.

The substances produced using the process of this invention may be utilized as water reducers and superplasticizers in cement or concrete compositions in the same manner as the additives described in U.S. Pat. No. 5,614,017 (incorporated herein by reference in its entirety).

EXAMPLES

Example 1

A mixture containing 75 g of a monofunctional polyether ("MP1"), having a number average molecular weight of about 2000, and 7.5 g water was heated to 60° C. in a 250 ml 4-neck round bottom flask equipped with a mechanical stirrer, reflux condenser, 60 ml addition funnel and a thermowell for the temperature controller. A mixture of 14.6 g acrylic acid, 14.6 g MP1, 2.3 g dodecyl mercaptan and 1.6 g 2,2'-azobis(isobutyronitrile) was charged to the addition funnel and then added to the reaction flask over 30 min. at 60° C. The mixture was heated for an additional 45 min at 60° C. The addition funnel was then replaced by a nitrogen inlet tube and the condenser was replaced by a Dean Stark tube and condenser. The pot temperature was increased to 120° C. while nitrogen was blown over the reaction mixture to strip water out of the reactor. After 50 min., 1.1 g of p-toluene sulfonic acid was added to the reaction mixture and the pot temperature was taken to 165° C. A sample of the product was taken after 1 hour at 165° C. The monofunctional polyether used (MP1) was prepared by reacting methanol with ethylene oxide and propylene oxide (70:30 molar ratio) in the presence of an alkali metal hydroxide catalyst.

Example 2

A mixture containing 75 g of the monofunctional polyether MP1 and 7.5 g water was heated to 60° C. in a 250 ml 4-neck round bottom flask as described in Example 1. A mixture of 14.6 g acrylic acid, 8.8 g of MP1, 8.7 g of a poly(propylene glycol) having a number average molecular weight of about 4200, 2.4 g dodecyl mercaptan and 1.7 g 2,2'-azobis(isobutyronitrile) was charged to the addition funnel and then added to the reaction flask over 30 min. at 60° C. After addition was complete the apparatus was reconfigured as described in Example 1 and the reaction mixture was heated to 120° C. over 2 hrs. p-Toluene sulfonic acid (1.1 g) was added to the reactor and the mixture was heated to 165° C. for 2 hours. The product had an acid number of 74 compared to a calculated value of 84 (assuming all the hydroxyl groups had reacted to form esters with the acrylic acid). The poly(propylene glycol) was made using a double metal cyanide catalyst.

Example 3

The procedure of Example 2 was repeated with 75 g of MP1 and 15.8 g water. A mixture of 15.2 g acrylic acid, 8.8 MP1, 7.3 g of a poly(propylene glycol) having a number average molecular weight of about 2200, 1.8 g AIBN and 2.5 g dodecyl mercaptan was charged to the additional funnel and then added to the reaction flask over 30 min. at 60° C. Water was stripped from the reaction mixture at 120° C. over 2 hours. p-Toluene sulfonic acid (1.1 g) was added to the reaction mixture which was then heated to 165° C. for 2 hours.

Example 4

The procedure of Example 2 was repeated except that no water was added to the reaction mixture. MP1 (94 g) was added to the reactor and heated to 60° C. A mixture of 18.6 g acrylic acid, 10.4 g MP1, 9.00 g of a 2200 molecular weight poly(propylene glycol), 2.3 g AIBN and 3.0 g dodecylmercaptan was charged to the addition funnel and then added to the reactor over 30 min. at 60° C. The reaction mixture was heated to 120° C. for 1 hour and then to 165° C. for 2 hours. The product had an acid number of 75 compared to expected value of 83 for the simple ester.

Example 5

The reaction products of Examples 1 through 4 were tested in mortar mixes. Slump was measured using a half-size slump cone; air content was determined by ASTM method C185. In a typical mix, 2700 g sand (ASTM C778 graded) was added to the required amount of water containing the admixture followed by 1200 g cement. The procedures of ASTM C305 were used for mixing. When necessary, a defoamer, (tributylphosphate) was added to the mix to give an air content similar to the no admixture case. A commercial superplasticizer, WRDA-19, manufactured by W. R. Grace & Co., was used for comparison. The results obtained are summarized in Table 1. Water reduction of greater than 16% is achieved with the additives of Examples 1–4 at dosages which are about one-quarter (¼) of that required for the commercial superplasticizer.

TABLE 1

Mortar Mixes

| Additive | Water/ Cement | Wt % Additive on Dry Cement | Defoamer (% of additive) | Slump, mm | % Air |
|---|---|---|---|---|---|
| None (control) | 0.50 | — | none | 78 | 5 |
| None (control) | 0.48 | — | none | 51 | 5 |
| None (control) | 0.42 | — | none | 24 | 6 |
| Example 1 | 0.42 | 0.2% | TBP (9%) | 61 | 6 |
| Example 2 | 0.42 | 0.2% | TBP (7%) | 79 | 8 |
| Example 3 | 0.42 | 0.2% | none | 65 | 7 |
| Example 4 | 0.42 | 0.2% | none | 75 | 9 |
| The following examples are comparative | | | | | |
| WRDA-19 | 0.42 | 0.2% | none | 22 | 8 |
| WRDA-19 | 0.42 | 0.5% | none | 41 | 7 |
| WRDA-19 | 0.42 | 0.8% | none | 81 | 8 |

TBP is tri-n-butyl phosphate. WRDA-19 is a commercial high range water reducer sold by W. R. Grace & Co.

We claim:

1. A method of producing a water reducing additive for cement comprising:

(a) polymerizing a polymerizable acid monomer containing at least one ethylenically unsaturated group in conjugation with a carboxyl group selected from the group consisting of carboxylic acid, carboxylic anhydride and carboxylic ester groups in a reaction medium comprising a polyether, said polyether being prepared by polymerizing a $C_2$–$C_4$ epoxide, to form a carboxylic acid polymer; and (b) reacting the carboxylic acid polymer and the polyether under conditions effective to achieve esterification of the polyether by the carboxylic acid polymer to form the water reducing additive.

2. The method of claim 1 wherein the polymerizable acid monomer is selected from the group consisting of methyl acrylate, methyl methacrylate, acrylic acid, methacrylic acid, maleic acid, fumaric acid, maleic anhydride, citraconic acid, citraconic anhydride, itaconic acid, itaconic anhydride, and mixtures thereof.

3. The method of claim 1 wherein the carboxylic acid polymer has a molecular weight of from 500 to 2,000,000.

4. The method of claim 1 wherein the $C_2$–$C_4$ epoxide is selected from the group consisting of ethylene oxide, propylene oxide, and mixtures thereof.

5. The method of claim 1 wherein the polyether is selected from the group consisting of monofunctional polyethers, difunctional polyethers, and mixtures thereof.

6. The method of claim 1 wherein the conditions in step (b) are effective to also achieve partial cleavage of the polyether and esterification of the cleavage products thereof by the carboxylic acid polymer.

7. The method of claim 1 wherein the polyether has a number average molecular weight of from 200 to 20,000.

8. The method of claim 1 wherein the polymerizable acid monomer has the structure

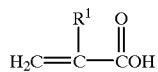

wherein $R^1$ is hydrogen or $C_1$–$C_4$ alkyl.

9. The method of claim 1 wherein the polymerizable acid monomer comprises at least 25 mole percent of the carboxylic acid polymer.

10. The method of claim 1 wherein step (a) is catalyzed by a free radical initiator.

11. The method of claim 1 wherein step (b) is catalyzed by a protic acid having a pKa of less than 0.

12. The method of claim 1 wherein step (a) is performed in the presence of a chain transfer agent.

13. The method of claim 1 comprising the additional step of converting at least a portion of the carboxylic acid groups in the water reducing additive to salt form.

14. A method of producing a water reducing additive for cement comprising:

(a) polymerizing a polymerizable acid monomer selected from the group consisting of methyl acrylate, methyl methacrylate, acrylic acid, methacrylic acid, maleic acid, fumaric acid, maleic anhydride, citraconic acid, citraconic anhydride, itaconic acid, itaconic anhydride, and mixtures thereof in a reaction mixture comprising a polyether, wherein said polyether is prepared by polymerizing an epoxide selected from the group consisting of ethylene oxide, propylene oxide, and mixtures thereof onto an initiator selected from monofunctional initiators, difunctional initiators, and mixtures thereof, in the presence of a free radical initiator and chain transfer agent to form a carboxylic acid polymer; and (b) reacting the carboxylic acid polymer and the polyether in the presence of a protic acid catalyst at a temperature greater than 120° C. for a time effective to achieve partial cleavage of the polyether and esterification of the polyether and cleavage products thereof by the carboxylic acid polymer to form the water reducing additive.

15. The method of claim 14 comprising the additional step of converting at least a portion of the carboxylic acid groups in the water reducing additive to salt form.

16. The method of claim 14 wherein the protic acid catalyst is selected from the group consisting of aryl sulfonic acids, alkyl sulfonic acids, sulfonic acid ion exchange resins, and salts thereof.

17. The method of claim 14 wherein the polyether is a mixture of a monofunctional polyether and a difunctional polyether.

18. The method of claim 17 wherein the weight ratio of monofunctional polyether to difunctional polyether is from 3:1 to 25:1.

19. The method of claim 14 wherein the polymerizable acid monomer comprises from 25 to 100 mole percent of the carboxylic acid polymer.

* * * * *